US007885271B2

(12) United States Patent
Li et al.

(10) Patent No.: US 7,885,271 B2
(45) Date of Patent: Feb. 8, 2011

(54) LATENCY EQUALIZATION FOR INTERACTIVE NETWORK APPLICATIONS

(75) Inventors: Li Li, Edison, NJ (US); Marina K. Thottan, Westfield, NJ (US); Minlan Yu, Princeton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 217 days.

(21) Appl. No.: 12/194,601

(22) Filed: Aug. 20, 2008

(65) Prior Publication Data

US 2010/0046527 A1    Feb. 25, 2010

(51) Int. Cl.
*H04L 12/28* (2006.01)
*G01R 31/08* (2006.01)

(52) U.S. Cl. .................. 370/400; 370/252; 370/255; 370/395.21

(58) Field of Classification Search ................ None
See application file for complete search history.

(56) References Cited

U.S. PATENT DOCUMENTS

| 2004/0146056 A1* | 7/2004 | Martin | 370/401 |
| 2008/0013465 A1* | 1/2008 | Yasukawa et al. | 370/256 |
| 2008/0119180 A1* | 5/2008 | Small et al. | 455/422.1 |

FOREIGN PATENT DOCUMENTS

EP    1429500 A    6/2004

OTHER PUBLICATIONS

Shankar M. Banik et al., "Multicast Routing with Delay and Delay Variation Constraints for Collaborative Applications on Overlay Networks," IEEE Transactions on Parallel and Distributed Systems, vol. 18, No. 3, Mar. 1, 2007, pp. 421-431.

Sun Wensheng et al., "Routing Multipoint Connections in Computer Networks," IEEE International Symposium on Circuits and Systems, 1998, vol. 6, pp. 494-495.

Minlan Yu et al., "Latency Equalization: A Programmable Routing Service Primitive," SIGCOMM 2008, PRESTO, Aug. 22, 2008, pp. 39-44.

Minlan Yu et al., "Latency Equalization: A Routing Service for Interactive Applications," www.cs.princeton.edu, year [retrieved on Oct. 1, 2009] Retrieved from the Internet: <URL: http://www.cs.princeton.edu/~minlanyu/writeup/leqtech.pdf.html> Princeton University Technical Report, Jul. 2009, pp. 1-11.

PCT International Search Report dated Oct. 15, 2009, for PCT Application No. PCT/US2009/054406 filed Aug. 20, 2009 (7 pages).

* cited by examiner

*Primary Examiner*—Kwang B Yao
*Assistant Examiner*—Jutai Kao
(74) *Attorney, Agent, or Firm*—Mendelsohn, Drucker & Associates, P.C.; Yuri Gruzdkov; Steve Mendelsohn

(57) ABSTRACT

A network configuration that supports latency-equalization (LEQ) routing by effectively "storing" packets on communication links, rather than at end points. A suitable network configuration is found by (i) identifying a candidate pool of routers through which the participating client terminals and application servers can exchange packets intended for LEQ routing and (ii) analyzing the delay inventory corresponding to the network paths connecting the client terminals and application servers, through those routers. Based on the analysis, M routers from the candidate pool are selected to serve as hub nodes. Each participating client terminal is assigned m of these M hub nodes and, thereafter, directs and receives its packets intended for LEQ routing through one of these m hub nodes.

18 Claims, 7 Drawing Sheets

100

LATENCY EQUALIZATION FOR INTERACTIVE NETWORK APPLICATIONS

BACKGROUND OF THE INVENTION

1. Field of the Invention

The present invention relates to networks and, more specifically, to communication protocols for controlling latency differences for network clients.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The increasing availability of broadband access to consumers and the ease with which network-based applications can be defined spawned a new generation of network users. Today, the end user expects the network to serve as an interactive medium for multimedia communications and/or entertainment. These expectations fuel the development of new network applications in the entertainment and business sectors. In the entertainment sector, such new applications involve multiple users participating in a single interactive session, such as on-line gaming or on-line music playing in a virtual (distributed) orchestra. The commercial sector offers new interactive services, such as telepresence and live bidding in e-commerce.

One requirement that an interactive application might have for the underlying network is latency bounds. However, when the application has multiple users, mere latency bounds no longer suffice because the user experience can be severely impacted by latency differences among the interacting users. For example, in online gaming, differences in lag experienced by different players can significantly reduce the entertainment value of the game, and game servers often enable the participants to vote out and exclude the players having relatively high lag times. In e-commerce, latency differences between different pairs of shopping and pricing agents can result in price oscillations leading to an unfair advantage to those pairs of agents whose latency differences are relatively small.

A typical prior-art approach to latency equalization is to perform it an end point, e.g., at the client or at the application server. Latency equalization at the client is based on hardware and software enhancements that speed up the processing of event updates and application rendering. However, these techniques are unable to appropriately compensate for the network-based delay differences. Latency equalization by the application server requires estimating the state of the network. However, such estimation has limitations because the application server usually infers the state of the network from the behavior of the applications being run even if the network-related issues are not the dominating factor in that behavior. Also, the overhead of network measurements and latency-equalization processing tend to impose a significant additional burden on the server's CPU, which might unacceptably reduce the maximum number of users that the server can accommodate at the same time.

SUMMARY OF THE INVENTION

Problems in the prior art are addressed by a network configuration that supports latency-equalization (LEQ) routing by effectively "storing" packets on communication links, rather than at end points. A suitable network configuration is found by (i) identifying a candidate pool of routers through which the participating client terminals and application servers can exchange packets intended for LEQ routing and (ii) analyzing the delay inventory corresponding to the network paths connecting the client terminals and application servers, through those routers. Based on the analysis, M routers from the candidate pool are selected to serve as hub nodes. Each participating client terminal is assigned m of these M hub nodes and, thereafter, directs and receives its packets intended for LEQ routing through one of these m hub nodes. In one embodiment, the analysis employs a greedy heuristic, each step of which identifies a router that can provide a maximum number of acceptable LEQ-routing paths for the eligible client terminals. Advantageously, LEQ routing with just a single hub node per client terminal (m=1) is capable of reducing the average delay difference with respect to that achieved under prior-art routing by as much as about 80%. Furthermore, the LEQ routing with m=2 or 3 is advantageously capable of substantially avoiding spikes in the delay differences induced by transient congestion of pertinent transmission links.

According to one embodiment, a method of routing packets between a set of two or more client terminals and an application server, all connected to a network, comprises the steps of: (A) selecting M hub nodes from a pool of candidate hub nodes, each candidate hub node being a router of said network, where M is a positive integer; (B) for each client terminal in said set, assigning m of the M hub nodes for LEQ routing, where m is a positive integer and $m \leq M$; (C) instructing an edge router connected to a client terminal belonging to said set to direct packets designated for LEQ routing from the client terminal to the application server, through at least one of the m hub nodes assigned to the client terminal; and (D) instructing an edge router connected to the application server to direct packets designated for LEQ routing from the application server to the client terminal, through at least one of the m hub nodes assigned to the client terminal.

According to another embodiment, a network comprises a network-management server and a plurality of interconnected routers adapted to route packets between a set of two or more client terminals and an application server, all connected to the network. The network-management server is adapted to: (A) select M hub nodes from a pool of candidate hub nodes, each candidate hub node being a router of said network, where M is a positive integer; and (B) for each client terminal in said set, assign m of the M hub nodes for LEQ routing, where m is a positive integer and $m \leq M$; (C) instruct an edge router connected to a client terminal from said set to direct packets designated for LEQ routing from the client terminal to the application server, through at least one of the m hub nodes assigned to the client terminal; and (D) instruct an edge router connected to the application server to direct packets designated for LEQ routing from the application server to the client terminal, through at least one of the m hub nodes assigned to the client terminal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Through experimentation and simulation, we have determined that it is beneficial to enable the network (as opposed to just the end nodes) to handle application-delay imbalances for different users. For example, according to one embodiment of our latency-equalization (LEQ) method, the network configures a small number (e.g., two to six) of its nodes to serve as "hub" nodes. A hub node can be an enhanced router capable of providing network services pertinent to the application in question. Alternatively, a hub node can be a stand-alone network appliance. The network selects and assigns a subset of the hub nodes to each client running a latency-imbalance sensitive application. The network then steers the packets corresponding to different clients through the respective assigned hub nodes, thereby reducing delay differences among the clients. In one configuration, the hub nodes are used to steer packets away from congested links. Advantageously, our LEQ routing architecture can coexist with and leverage prior-art latency-capping network functions.

Figure 1:
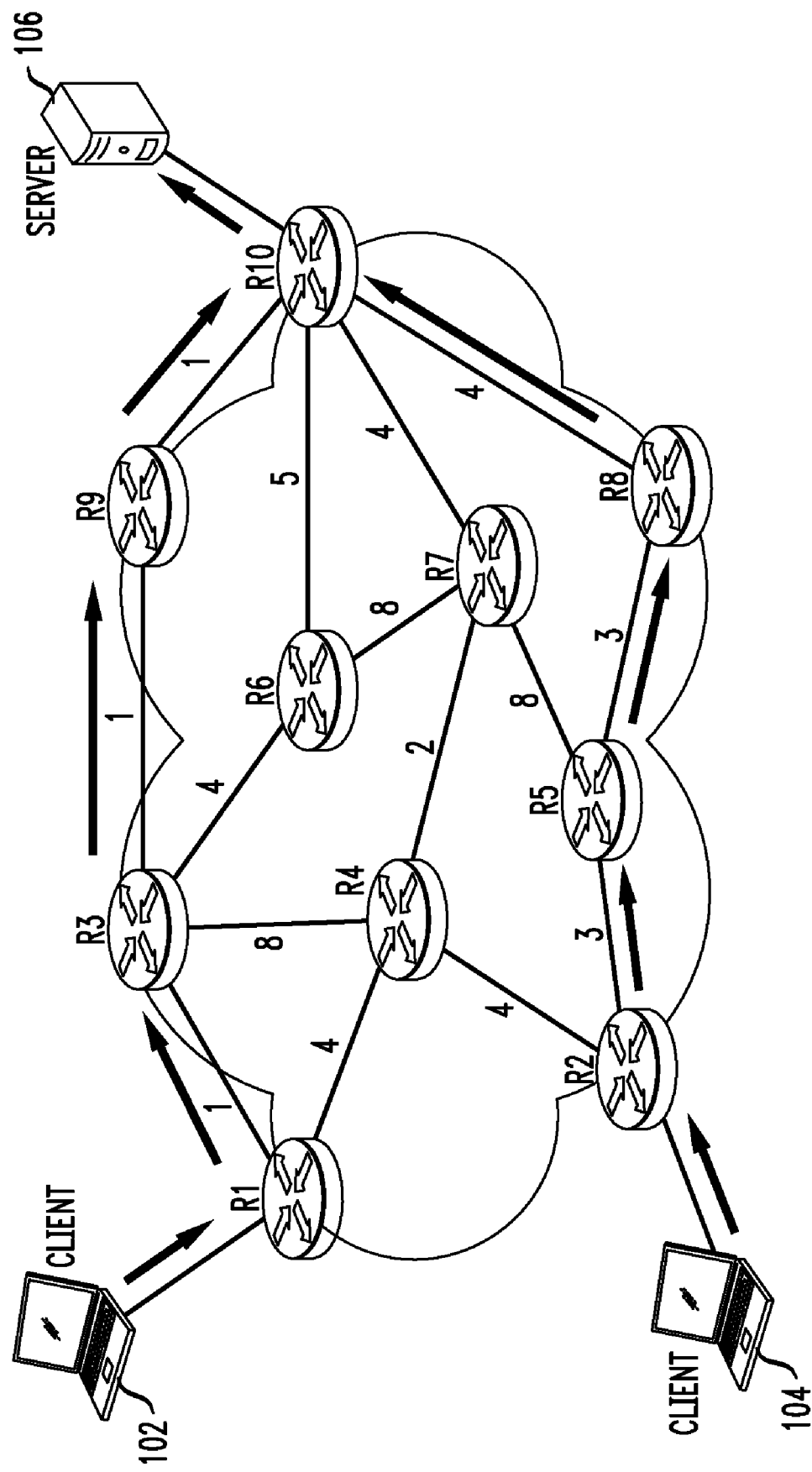
FIG. 1 illustrates a representative prior-art routing protocol.

FIG. 1 illustrates a representative prior-art routing protocol. More specifically, a network 100 shown in FIG. 1 has client terminals 102 and 104, routers R1-R10, and an application server 106. Client terminals 102 and 104 are connected to edge routers R1 and R2, respectively. Server 106 is connected to edge router R10. Depending on the network topology, an edge router can simultaneously serve as a client edge router (similar to edge router R1 or R2) and a server edge router (similar to edge router R10). The number indicated in FIG. 1 adjacent to each link of network 100 represents the link's weight (in milliseconds), which is generally related to the propagation delay in the link.

In the configuration of FIG. 1, network 100 uses an Open Shortest Path First (OSPF) routing protocol, which directs traffic from client terminals 102 and 104 to server 106 through low-latency paths. Thus, packets from client terminal 102 are directed through the following path: R1→R3→R9→R10, which has a cumulative delay of 3 ms. Similarly, packets from client terminal 104 are directed through the following path: R2→R5→R8→R10, which has a cumulative delay of 10 ms. As a result, there is a 7-ms delay difference between client terminals 102 and 104. As already explained above, this delay difference can be a significant problem for both the application server and the client terminals running real-time interactive applications. More details on the OSPF routing protocol can be found, e.g., in a book by John T. Moy, entitled "OSPF: Anatomy of an Internet Routing Protocol," published by Addison-Wesley in 1998, which is incorporated herein by reference in its entirety.

Figure 2:
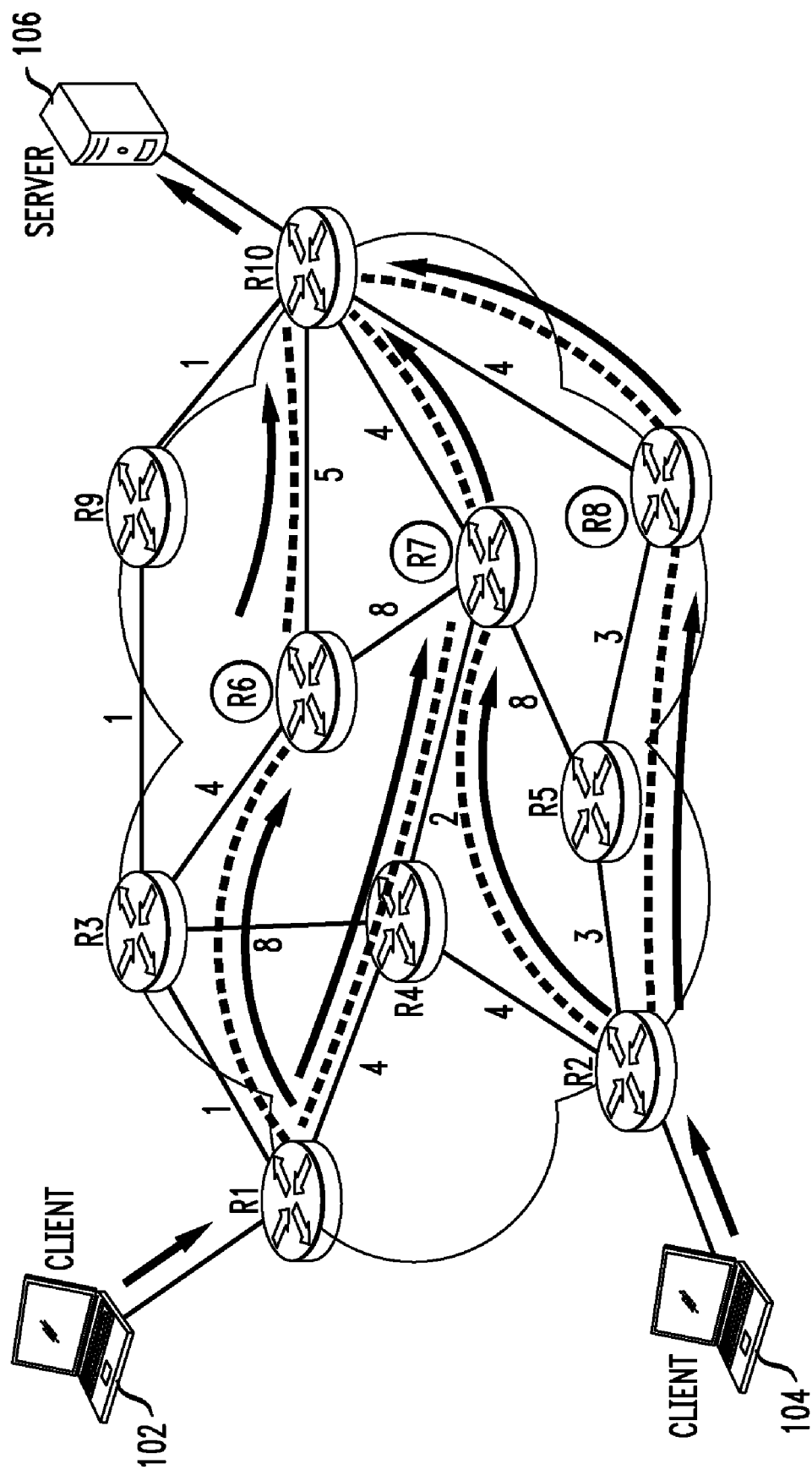
FIG. 2 illustrates a latency-equalization (LEQ) routing protocol according to one embodiment of the invention.

FIG. 2 illustrates an LEQ-routing protocol according to one embodiment of the invention. More specifically, in FIG. 2, network 100 is reconfigured from the configuration of FIG. 1 to an LEQ configuration, in which routers R6, R7, and R8 are designated as hub nodes. Routers R6 and R7 are selected and assigned to be hub nodes for client terminal 102. Routers R7 and R8 are selected and assigned to be hub nodes for client terminal 104. Network 100 forces the packets from client terminals 102 and 104 to go to the assigned hub nodes, e.g., through the network tunnels that are set-up for that purpose. The hub nodes then redirect the packets to server 106. The downlink traffic follows the reverse paths.

In the routing configuration shown in FIG. 2, latency equalization is achieved through intelligent selection and assignment of hub nodes, which is described in more detail below, e.g., in reference to FIGS. 4-5. As a result, edge router R1 has two paths to edge router R10: R1→R6→R10 and R1→R7→R10, each of which has a cumulative delay of 10 ms. Similarly, edge router R2 has two paths to edge router R10: R2→R7→R10 and R2→R8→R10, each of which also has a cumulative delay of 10 ms. As can be seen in FIG. 2, network 100 uses routers R6 and R7 to direct packets corresponding to client terminal 102 through a longer path than the OSPF path of FIG. 1, thereby equalizing the cumulative propagation delays for the two client terminals.

There are three hub nodes (i.e., R6, R7, and R8) in the routing configuration of FIG. 2. Each of client terminals 102 and 104 is assigned two of these hub nodes. One reason for assigning multiple hub nodes to a client terminal is that the overall network delay experienced by a client has at least two parts: propagation delay and queuing delay. If pertinent links of network 100 are not significantly congested, then the overall delay is dominated by the propagation delay. However, if some links become heavily congested, then the queuing delay on those links might become a significant factor in the overall delay. Having two or more hub nodes assigned to each client terminal enables the network to direct packets through an alternative, less congested path, thereby substantially taking the queuing delay out of the picture.

To be able to bypass congestion, an edge router first identifies application packets based on the port number and the IP addresses of the application server(s). The edge router then duplicates the packets in accordance with the number of hub nodes assigned to the client by the LEQ-routing protocol and sends the duplicate packet copies through tunnels to the corresponding hub nodes. The hub nodes then tunnel the copies to the destination edge router. The destination edge router uses the first received copy and discards the subsequently received copies. Application identification and packet tunneling are known in the art and are normally supported by conventional network routers.

Yet another part of the delay experienced by a client is the network-access delay. The term "network-access delay" refers to the delay on the link between a network client (e.g., one of client terminals 102 and 104 and server 106) and the corresponding edge router (e.g., R1, R2, or R10). The network-access delay generally depends on the access technology employed by the client and the traffic load on the corresponding link. For example, for dial-up, cable, and asymmetric digital subscriber line (ADSL) representative network-access delays are 182 ms, 19 ms, and 15 ms, respectively. The network-access delay is generally negligible for the fiber-optic-service (FIOS) technology. In one embodiment, the LEQ-routing protocol takes into account the disparity in the network-access delays by grouping clients into latency subgroups and providing latency equalization within each of those subgroups independently.

Figure 3:
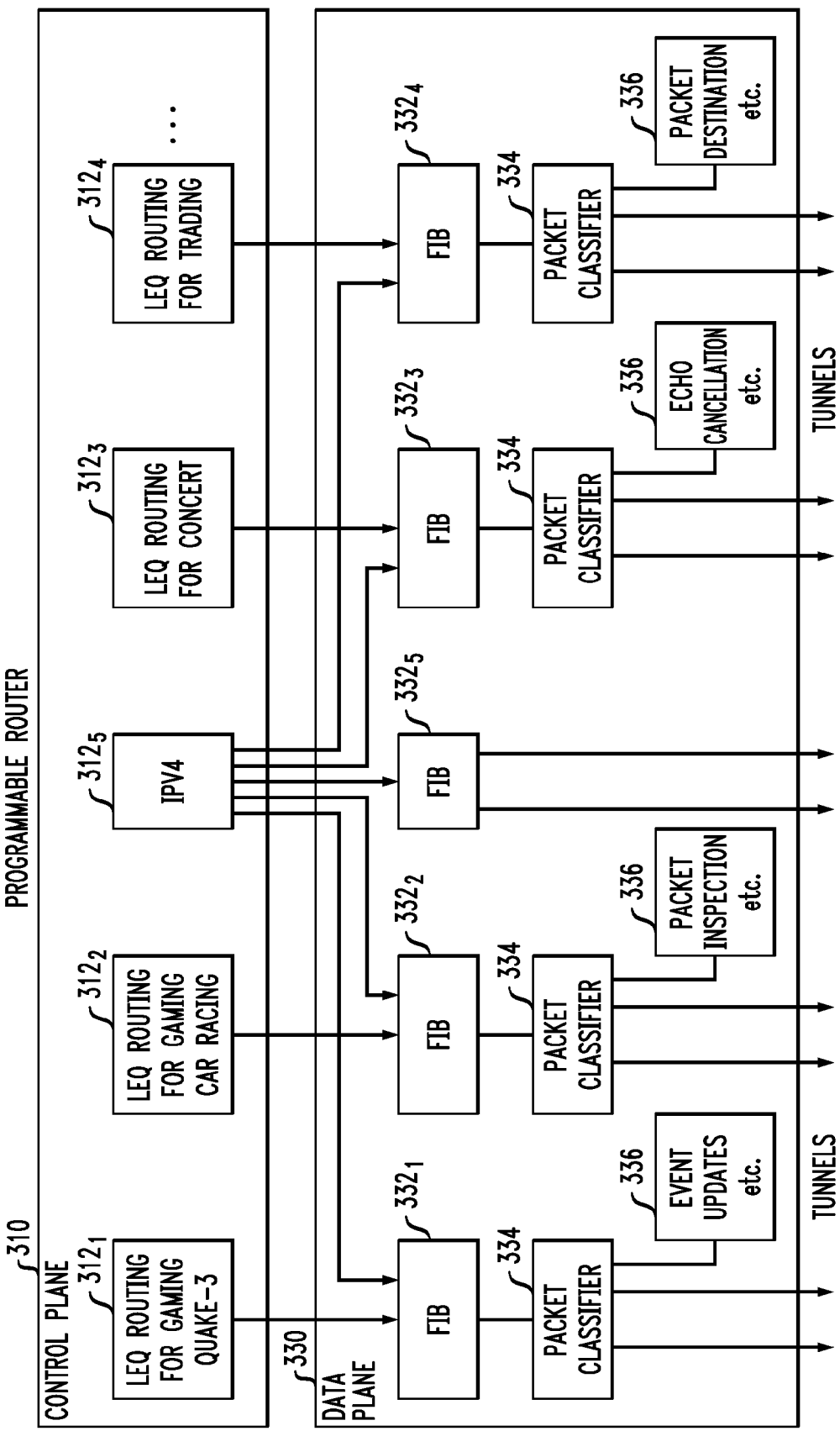
FIG. 3 shows a block diagram of a hub node according to one embodiment of the invention.

FIG. 3 shows a block diagram of a hub node 300 according to one embodiment of the invention. Hub node 300 has a control plane 310 and a data plane 330. Based on the routing requirements of different applications, control plane 310 can be programmed to run several LEQ-routing protocols in parallel in a virtual router environment. For example, FIG. 3 shows a configuration, in which control plane 310 has been programmed to run four LEQ routing protocols $312_1$-$312_4$ handling online games Quake-3 and Car Racing, a distributed online concert performance, and an online trading session, respectively. Control plane 310 is also programmed to run a copy $312_5$ of the regular Internet Protocol version 4 (IPv4), which can be used by the LEQ applications for the initial setup and by non-LEQ applications for prior-art non-LEQ routing.

Each routing protocol installs in data plane 330 a corresponding forwarding table 332, also often referred to as the forwarding information base (FIB), that caters to the routing requirements of the application. For example, each of LEQ-routing protocols $312_1$-$312_4$ can have a different target delay value. Note that each of forwarding tables $332_1$-$332_4$ receives route computations both from the corresponding LEQ-routing protocol 312 and from the IPv4.

A packet classifier 334 is used to identify different packet types within each application to enable hub node 300 to apply customized routing to the packets. Packets from different applications are identified by the source and destination IP addresses. Within an application, packets are classified based on the port number or application tag. For example, packets in a gaming application can be classified into game setup packets and interactive-event packets based on their tags. In the initial game setup, e.g., when the player downloads a map from the gaming server, the corresponding setup packets are preferably routed using shortest-path (e.g., OSPF) routing to reduce the download time. However, during the interactive portion of the game, interactive-event packets are routed using the LEQ routing.

Data plane 330 can optionally use application-level packet processing 336. For example, for online gaming, packet processing 336 can be used to aggregate event updates and inspect packets for virus signatures. For a distributed live concert, packet processing 336 can be used for sound amplification, echo cancellation, and distortion compensation. Packet processing 336 can further be used to provide the applications with an opportunity to reconsider their packet destinations on the fly. For example, in peer-to-peer (P2P) games, hub node 300 can perform load balancing among multiple application servers and aid in server migration by doing a soft hand-off between the servers, wherein packets are sent to both the old server and the new server until the migration process is completed.

For at least some of the following reasons, hub node 300 enables LEQ routing to be deployed relatively easily and inexpensively: (1) deployment of only a few hub nodes 300 is sufficient to support LEQ routing, which minimizes the cost of rollover from non-LEQ to LEQ routing; (2) incremental deployment of hub nodes 300 is permissible because deployment of a single hub node can significantly reduce the delay disparity (see FIG. 6); and (3) no modification of the underlying routing protocols is necessary because the LEQ function can be implemented as an overlay on substrate routers.

In the description that follows, we first formulate, in mathematical terms, the problem of selecting and assigning hub nodes for the purpose of LEQ routing. We then describe two representative methods (algorithms) for solving this mathematical problem. Each of the two methods can be implemented in a network analogous to network 100.

In the problem formulation, we assume that each client terminal and application server is connected to the network through its corresponding edge router, e.g., as shown in FIGS. 1 and 2. The connection can be through regular Internet routing or through tunneling. Each edge router is adapted to measure or infer the delay between itself and each of its clients. For example, in network 100, edge router R1 "knows" the delay between itself and client terminal 102. Similarly, edge router R2 "knows" the delay between itself and client terminal 104, and edge router R10 "knows" the delay between itself and server 106. If an edge router has more than one client (e.g., more than one client terminal or more than one application server or a combination of client terminals and application servers), then the edge router can sort its clients into groups based on their access delay. For example, an edge router can sort its clients into four groups corresponding to the following access-delay intervals expressed in ms: [0,30),[30,60), [60,100), [100,∞). For the purpose of LEQ routing, access delay a(p) for client p is then defined as the median delay of the corresponding client group.

Without loss of generality, we consider each client group to be a single client of the corresponding edge router. We denote d(u, v), u, v ∈ V as the propagation delay of the underlying network path between routers u and v. Note that d(u, v) is defined over router set V, which includes at least three subsets: (1) subset $V_S$ of application-server edge routers; (2) subset $V_P$ of client-terminal edge routers; and (3) subset $V_H$ of routers that are candidate hub nodes. It is assumed that d(u, v)=d(v, u).

Suppose that there are a total of $N_S$ application servers on the network. For each client terminal $p_i$, these $N_S$ servers are sorted to select r servers having the r shortest propagation delays with respect to the client terminal. The r selected servers form a group denoted $S_{pi}$.

$D_{max}$ denotes a maximum delay that each client terminal can tolerate on its paths to and from the servers in group $S_{pi}$. M denotes the number of routers that can serve as hub nodes, which number is preferably greater than one. We require that each LEQ client be connected to m hub nodes, where $1 \leq m \leq M$.

Given M, m, r, and $D_{max}$, the LEQ algorithm is supposed to find, for each client terminal $p_i$, a corresponding set $H_{pi}$ of m hub nodes that provide propagation paths characterized by minimum delay differences with respect to the propagation paths found for other participating client terminals. Eq. (1) defines a parameter (δ) that can be used to quantify this LEQ search:

$$\delta = \max_{p_i \in V_P, h_j \in H_{pi}, s_k \in S_{pi}} (d(p_i, h_j) + d(h_j, s_k)) - \min_{p_i \in V_P, h_j \in H_{pi}, s_k \in S_{pi}} (d(p_i, h_j) + d(h_j, s_k)) \quad (1)$$

where $d(p_i, h_j)$ is the delay from client terminal $p_i$ to hub node $h_j$, and $d(h_j, s_k)$ is the delay from hub node $h_j$ to server $s_k$. $d(p_i, h_j)$ consists of two components: the access delay for the client terminal to its edge router and the delay from the edge router to hub node $h_j$. Similarly, $d(h_j, s_k)$ consists of two components: the delay from hub node $h_j$ to the server $s_k$'s edge router and the access delay for the server. Conceptually, parameter δ is the spread of delay values for the set of participating client terminals.

The LEQ algorithm seeks to minimize δ using constraints (2)-(7):

$$\sum_{j \in V_H} y_j \le M \quad (2)$$

$$x_{ij} \le y_j, \forall\, p_i \in V_P, h_j \in V_H \quad (3)$$

$$\sum_{j \in V_H} x_{ij} \ge m, \forall\, p_i \in V_P \quad (4)$$

$$d_{ijk} x_{ij} \le D_{max}, \forall\, p_i \in H_{pi}, s_k \in S_{pi} \quad (5)$$

$$(d_{ijk} - d_{i'j'k'})(x_{ij} + x_{i'j'} - 1) \le$$
$$\delta, \forall\, p_i, p'_i \in V_P, h_j, h'_j \in H_{pi}, s_k, s'_k \in S_{pi} \quad (6)$$

$$y_j = \{0,1\}, x_{ij} = \{0,1\} \quad (7)$$

where $y_j=1$ means that the corresponding router is a hub node, i.e., is $h_j$; $y_j=0$ means that the corresponding router is not a hub node; $x_{ij}=1$ means that hub node $h_j$ is a hub node for client terminal $p_i$; $x_{ij}=0$ means that hub node $h_j$ is not a hub node for client terminal $p_i$; and $d_{ijk} \equiv d(p_i, h_j) + d(h_j, s_k)$.

Constraint (2) states that the total number of hub nodes cannot exceed M. Constraint (3) states that each client terminal can only select its hub nodes from subset $V_H$. Constraint (4) states that each client terminal is assigned at least m hub nodes. Constraint (5) states that the maximum delay cannot exceed $D_{max}$. Constraint (6) specifies that pair-wise delay differences cannot exceed δ. Constraint (7) indicates that $y_j$ and $x_{ij}$ are binary variables. Note that constraint (6) is meaningful only if $x_{ij}=1$ and $x_{i'j'}=1$. Otherwise, it is trivially true.

It can be shown that, for m<M, the computational problem defined by Eqs. (1)-(7) is NP-hard (i.e., nondeterministic polynomial-time hard). We therefore begin with a simpler-to-solve case of m=M. An LEQ algorithm for this case is described below in reference to FIG. 4. We then continue with an LEQ algorithm for a more-difficult-to-solve case of m<M. This algorithm is described below in reference to FIG. 5.

Figure 4:
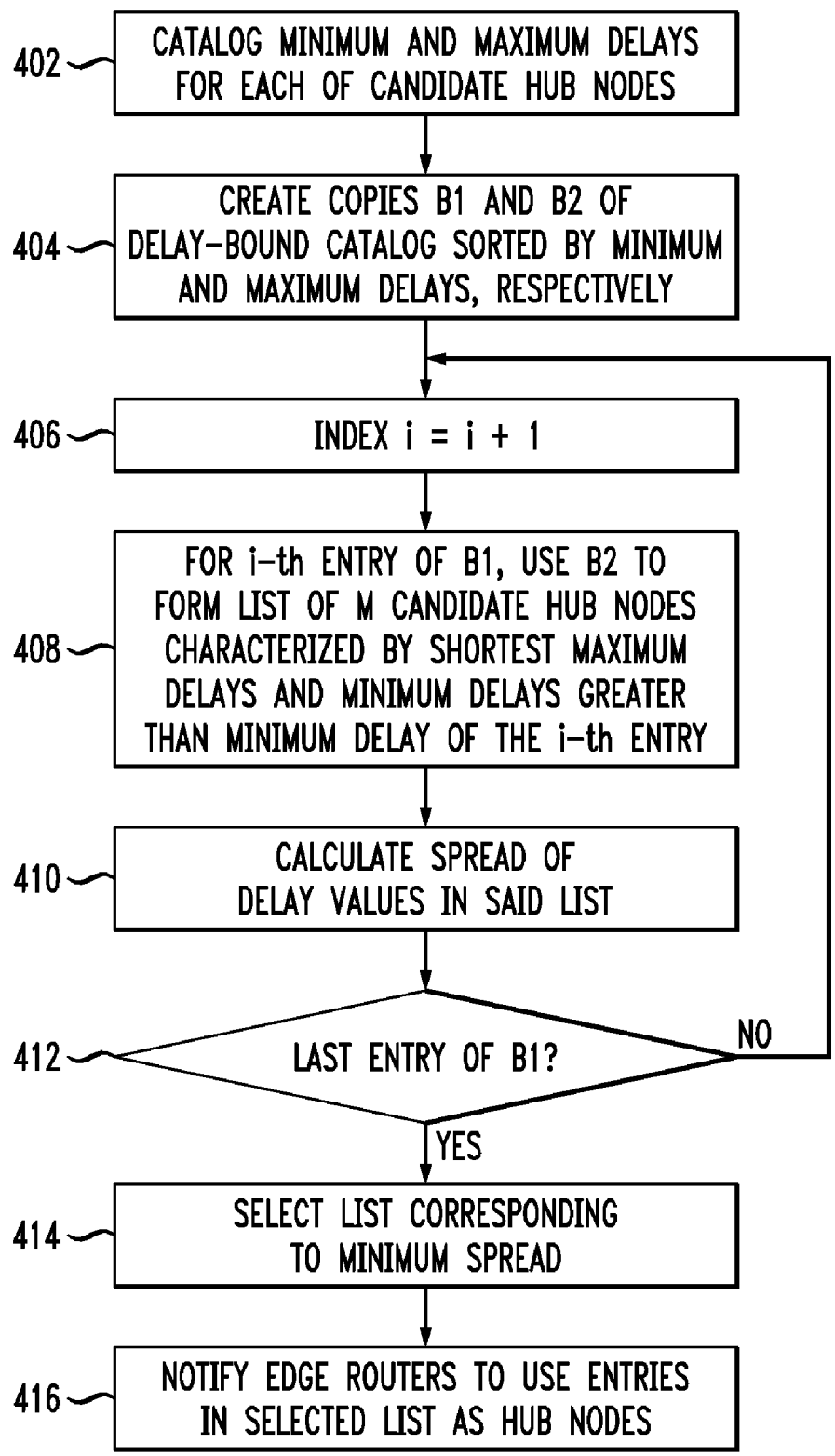
FIG. 4 shows a flowchart of a method of selecting hub nodes for a network configuration analogous to that shown in FIG. 2 according to one embodiment of the invention.

FIG. 4 shows a flowchart of a method 400 of selecting hub nodes for a network configuration analogous to that shown in FIG. 2 according to one embodiment of the invention. Method 400 provides a solution to the above-formulated mathematical problem for the case of m=M. In one embodiment, method 400 is executed by a network-management server (not explicitly shown in FIGS. 1 and 2). Typically, the Internet service provider (ISP) has a number of servers designated for network management. A network-management server may or may not serve as an application server similar to application server 106 (FIGS. 1 and 2). The network-management server is configured to collect path-delay information and "knows" which routers in the network are configurable (i.e., have the physical capacity) to serve as hub nodes, e.g., by virtue of being analogous to hub node 300 (see FIG. 3). Hereafter, the routers configurable to serve as hub nodes are referred to as "candidate hub nodes."

Method 400 begins at step 402, in which a table (hereafter referred to as the "delay-bound catalog") cataloging the minimum and maximum delays for each of the candidate hub nodes is compiled. It is relatively straightforward for the network-management server to create a delay-bound catalog, e.g., by inspecting, for each of the candidate hub nodes, delay values corresponding to the routes from different client terminals, through that particular candidate hub node, to the application server. In one embodiment, the delay-bound catalog has three columns: (1) network ID of the candidate hub node, denoted hid; (2) minimum delay over the set of participating client terminals, denoted mnd; and (3) maximum delay over the set of participating client terminals, denoted mxd.

At step 404, the delay-bound catalog is sorted to create two sorted copies. The first sorted copy, $B_1$, is a copy sorted by the values of mnd, in the ascending order. The second sorted copy, $B_2$, is a copy sorted by the values of mxd, also in the ascending order.

At step 406, an index (i) is incremented by one. Note that the initial value of this index is set to zero.

At step 408, the i-th row of table $B_1$ is selected. Then, starting from the top row of table $B_2$ and going down, the first M entries whose mnd is greater than the mnd of the i-th entry in table $B_1$ are determined. These M entries form a list denoted $L_i$.

At step 410, parameter $\delta_i$ is calculated using Eq. (8):

$$\delta_i = \max_{L_i}(mxd) - mnd_i \quad (8)$$

where $$\max_{L_i}(mxd)$$

denotes the maximum value of mxd in list $L_i$, and $mnd_i$ is the mnd of the i-th entry in table $B_1$.

At step 412, it is determined whether the last row of table $B_1$ has been processed. If not, then the processing of method 400 is returned to step 406. Otherwise, the processing continues on to step 414.

At step 414, an array of $\delta_i$ values produced in different instances of step 410 is inspected to determine the index ($i_0$) corresponding to the smallest δ in the array. Candidate hub nodes listed in list $L_{i_0}$ represent a solution to our problem and, as such, are selected as the M hub nodes for LEQ routing.

At step 416, the edge routers corresponding to the participating client terminals are notified by the network-management server about the selection. Thereafter, when a client's packet arrives at the corresponding edge router, the edge router will analyze the packet's header to determine whether the packet is intended for LEQ routing. If it is, then the edge router will direct the packet to the corresponding application server through one of the hub nodes. As already indicated above, traffic-load and link-congestion considerations might be factored in while selecting a particular one of the M hub nodes for handling the packet.

Figure 5:
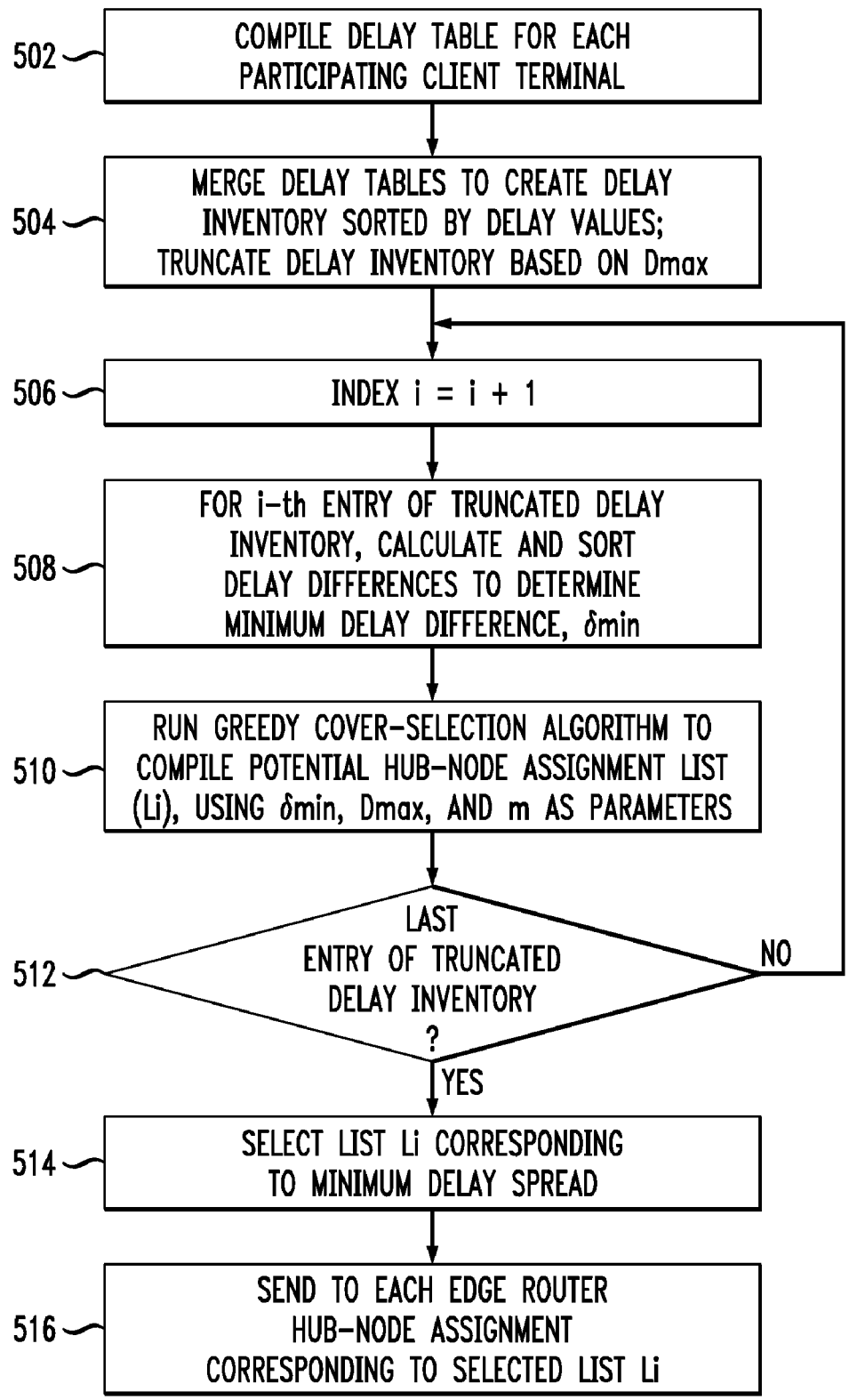
FIG. 5 shows a flowchart of a method of selecting hub nodes for a network configuration analogous to that shown in FIG. 2 according to another embodiment of the invention.

FIG. 5 shows a flowchart of a method 500 of selecting hub nodes for a network configuration analogous to that shown in FIG. 2 according to another embodiment of the invention. Method 500 provides an approximate solution to the above-formulated mathematical problem for the case of m<M. Similar to method 400, method 500 can be executed by a network-management server.

One skilled in the art will appreciate that method 500 employs a greedy heuristic designed to select hub nodes from the available pool of candidate hub nodes so that each participating client terminal is appropriately covered at least m times. As used herein, the term "cover" means a network path from a client terminal, through a hub node, to the application server that satisfies the LEQ routing constraints, such as those expressed by Eqs. (2)-(7). Although greedy algorithms often fail to find the globally optimal solution due to their tendency to make commitments to certain choices too soon, it is generally known that they work reasonably well in the field of network routing and are capable of finding good approximations to the globally optimal solution.

At step 502 of method 500, for each client terminal, a corresponding delay table is compiled. The delay table lists delays corresponding to the network paths from the client terminal to the application server(s), through different candidate hub nodes. If there are q participating client terminals, then q delay tables are compiled. For example, in reference to FIG. 2, the delay table corresponding to client terminal 102 might contain three entries with delays corresponding to the network paths from edge router R1 to edge router R10, through candidate hub nodes R6, R7, and R8, respectively. Similarly, the delay table corresponding to client terminal 104 might contain three entries with delays corresponding to the network paths from edge router R2 to edge router R10, through candidate hub nodes R6, R7, and R8, respectively. Since there are two participating client terminals, i.e., client terminals 102 and 104, a total of two delay tables are compiled.

At step 504, the delay tables corresponding to different client terminals are merged together to form a delay inventory, based on which a suitable LEQ-routing configuration can be selected. The delay inventory is then sorted by the delay values, in the ascending order. The sorted delay inventory is truncated to remove entries with delay values exceeding $D_{max}$. Recall that $D_{max}$ is the maximum delay that can be tolerated by the client terminals on their connections to the application server(s). The truncated inventory is denoted $A_i$.

At step 506, an index (i) is incremented by one. Note that the initial value of this index is set to zero.

At step 508, the i-th entry of the truncated delay inventory is selected. Then, for each of the other entries of the truncated delay inventory, the delay difference between the i-th entry and that other entry is calculated. The calculated delay differences are sorted to determine the minimum delay difference, $\delta_{min}$.

At step 510, a greedy cover-selection algorithm is executed to compile a list denoted $L_i$. Each entry in list $L_i$ identifies a different one of the candidate hub nodes selected from the pool of available candidate hub nodes. The greedy cover-selection algorithm compiles list $L_i$ by adding one entry at a time using the values of $\delta_{min}$, $D_{max}$, and m as parameters.

To determine the first entry for list $L_i$, the algorithm finds a candidate hub node that provides, for the participating client terminals, a maximum number of "covers" whose pair-wise delay differences do not exceed $(\delta_{min}+D_{max})/2$. In this context, a "cover" is a network path from a participating client terminal, through the candidate hub node, to the application server. Each cover is counted toward the goal of finding m covers for the corresponding client terminal. The covers corresponding to the first entry of list $L_i$ are evaluated to determine (1) the minimum delay, $D_{min}$, and (2) the maximum delay difference, $\delta_i$, among them. The candidate hub node selected to be the first entry in list $L_i$ is removed from consideration in the subsequent steps of the algorithm.

To determine the second entry for list $L_i$, the algorithm finds, among the remaining candidate hub nodes, a candidate hub node that provides, for the not-yet-fully-covered client terminals, a maximum number of covers for which the minimum delay is not greater than $D_{min}$ and the pair-wise delay differences do not exceed $\delta_i$. A client terminal is considered to be "fully covered" if and only if it has at least m valid covers provided by the previously entered into list $L_i$ candidate hub nodes. The candidate hub node selected to be the second entry for list $L_i$ is removed from consideration in the subsequent steps of the algorithm. Each cover corresponding to the second entry is counted toward the goal of finding m covers for the corresponding client terminal.

To determine each subsequent entry for list $L_i$, the algorithm substantially repeats the processing corresponding to the second entry, albeit with some modifications. For example, one modification is that the pool of available candidate hub nodes is shrinking due to the removal from consideration of the previously listed candidate hub nodes. Another modification is that some of the client terminals might become "fully covered" and, as such, are no longer considered when the covers provided by the next selected candidate hub node are counted.

At step 512, it is determined whether the last entry of truncated inventory $A_i$ has been processed. If not, then the processing of method 500 is returned to step 506. Otherwise, the processing continues on to step 514.

At step 514, an array of $\delta_i$ values produced in different instances of step 510 is inspected to determine the index ($i_0$) corresponding to the smallest $\delta$ in the array. Candidate hub nodes listed in list $L_{i_0}$ represent an acceptable approximate solution to our problem, provided that the number of entries in list $L_{i_0}$ does not exceed M. If there are several lists $L_i$ characterized by the same smallest $\delta$, then the list characterized by the smallest $D_{min}$ is selected from those several lists.

At step 516, the edge routers corresponding to the participating client terminals are notified by the network-management server about the selection of hub nodes. More specifically, each edge router receives a hub-node assignment listing the m hub nodes that provide the m covers for the corresponding client terminal in list $L_{i_0}$. Thereafter, when a client's packet arrives at the corresponding edge router, the edge router will analyze the packet's header to determine whether the packet is intended for LEQ routing. If it is, then the edge router will direct the packet to the corresponding application server through one of the m assigned hub nodes. The edge router(s) corresponding to the application server(s) are similarly notified about the hub-node assignments and, thereafter, direct packets intended for LEQ routing through the hub nodes specified in the hub-node assignments.

Figure 6:
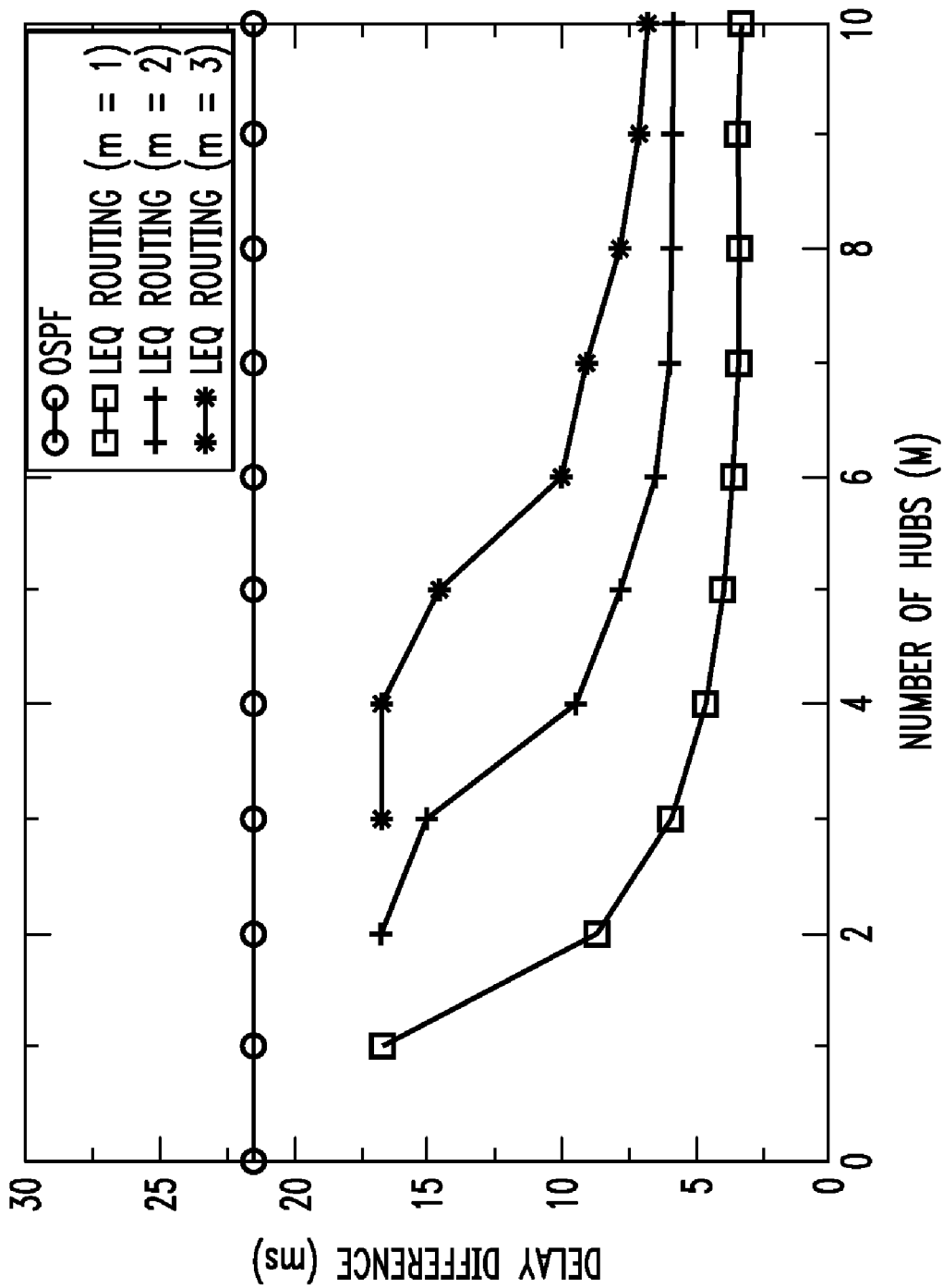
FIG. 6 graphically compares average delay differences corresponding to a prior-art routing method and an LEQ routing method of the invention under static traffic conditions.

FIG. 6 graphically compares average delay differences corresponding to a prior-art OSPF routing method and an LEQ routing method of the invention under static traffic conditions. The data of FIG. 6 were obtained by simulating the performance of the Telstra network, which has 97 nodes connected by 132 links. The average is taken over all client paths to one application server.

As can be seen in FIG. 6, LEQ routing with a single hub node per client terminal (m=1) is capable of reducing the average delay difference with respect to that achieved with OSPF routing by as much as about 80%. It is also clear that the best performance for LEQ routing is achieved when the number of hub nodes per client terminal is set to one (m=1). As the number of hub nodes per client terminal increases, the average delay difference increases, which is due to the increased path diversity. However, even with three hub nodes per client terminal, the LEQ routing performs significantly better than the OSPF routing in terms of the average delay differences.

Further analysis of our simulation results revealed that LEQ routing achieves smaller delay differences at the expense of increasing the average delay for the terminals to which relatively short paths are available in the network. However, for many applications, the absolute delay is not as critical as the delay difference, as long as the absolute delay is capped by a relatively short value of $D_{max}$. This observation highlights the major concept underlying LEQ routing: LEQ routing effectively "stores" packets on network paths, rather than buffering them at various end points, with the lengths of packet-storing paths selected so as to achieve relatively small delay differences among the participating client terminals.

Figure 7:
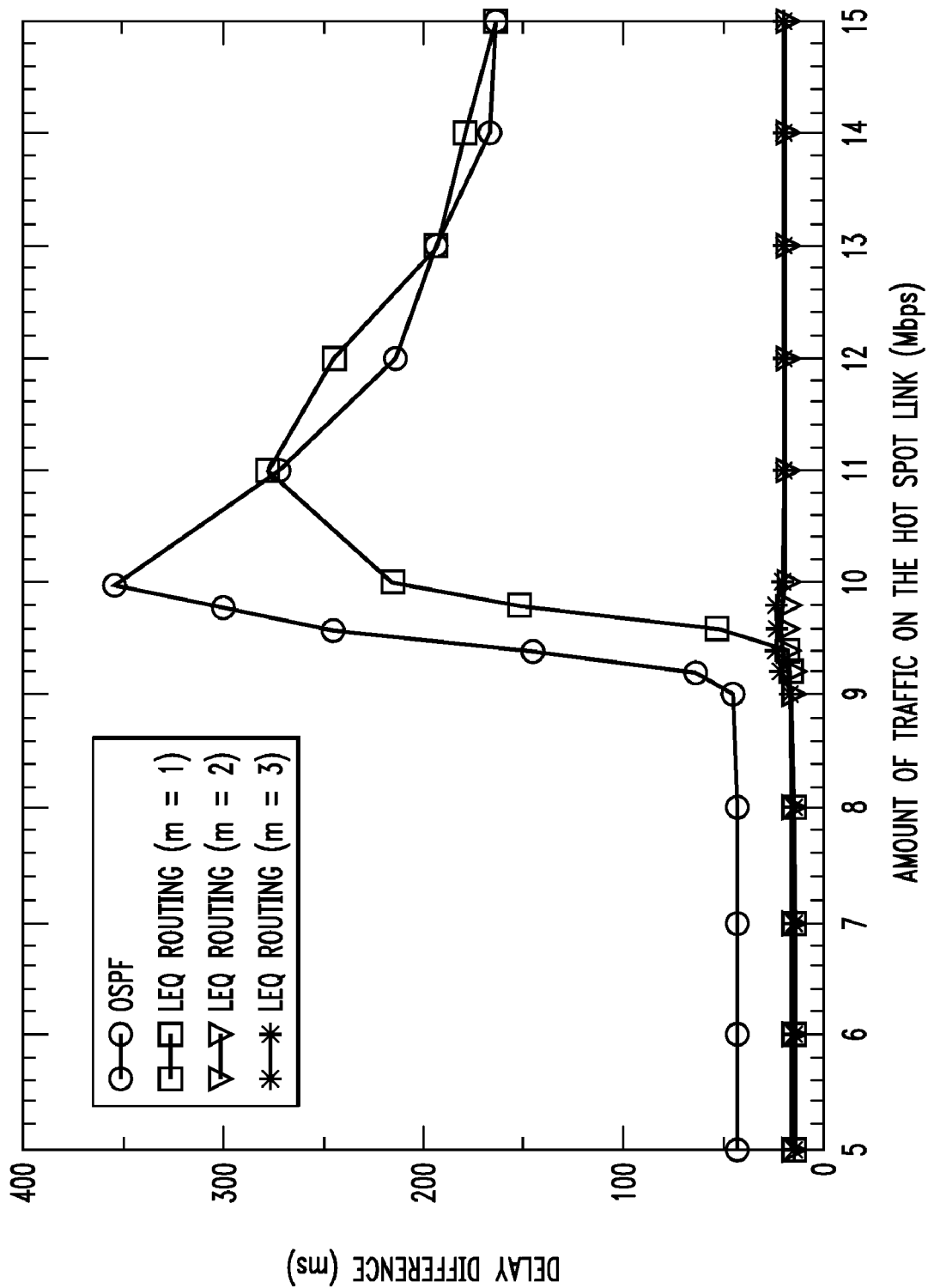
FIG. 7 graphically compares delay differences corresponding to a prior-art routing method and an LEQ routing method of the invention under dynamic traffic conditions.

FIG. 7 graphically compares delay differences corresponding to a prior-art OSPF routing method and an LEQ routing method of the invention under dynamic traffic conditions. The data of FIG. 7 were obtained by simulating the performance of the Abilene network, which has 11 nodes connected by 14 links. The network has a single server located in Washington, D.C. Each of the 11 nodes has one or more client terminals connected to it. For simulation purposes, the bandwidth capacity of each link is set to about 10 Mbps.

For typical traffic-load conditions, network links operate at lower than about 50% utilization. However, it has been observed that, in the presence of bursty or long-range-dependent traffic, average link utilization can spike up to about 95% of the link's capacity. For such spikes, packet-queuing times significantly contribute to the overall network delay.

Background traffic matrices for the simulation were generated by analyzing packet traces of Abilene Netflow data and scaling the volume down by 1000 times to match the 10-Mbps link capacity because, in reality, the Abilene link bandwidth is about 10 Gbps. Extra traffic was added as necessary to the link between Denver and Kansas City to create a traffic bottleneck at that link.

The various curves shown in FIG. 7 depict the maximum delay difference for the OSPF and LEQ routing when there is a traffic-load spike on the link between Denver and Kansas City. The results show that, when the amount of traffic begins to approach the link's capacity, both the OSPF routing and the LEQ routing with m=1 experience significant increases in the delay disparity due to the increased queuing delay. However, the LEQ routing with m=2 or 3 is advantageously capable of substantially avoiding such an increase due to the path diversity afforded by multiple hub nodes.

As used in this specification and the appended claims, the term "LEQ routing" refers to a routing method aimed at reducing routing delay disparities among the participating client terminals. Depending on the topology of the network, the location of candidate hub nodes, client terminals, and application servers connected to the network, and the values of m and M, methods of the invention may or may not be able to fully equalize the routing delays. However, the spread of delay values obtained under an LEQ-routing protocol of the invention at least approximates the optimal minimum spread value that is theoretically attainable for the network, wherein the term "optimal minimum spread value" refers to the global theoretical minimum of Eq. (1) over a set of conditions defined by Eqs. (2)-(7). One skilled in the art will appreciate that method 400 (see FIG. 4) is capable of finding an LEQ-routing configuration whose delay spread is substantially equal to the optimal minimum spread value. Method 500 (see FIG. 5) is capable of finding an LEQ-routing configuration whose delay spread might be greater than the optimal minimum spread value but smaller than the spread value corresponding to OSPF routing. In one of the worst case scenarios, i.e., when the optimal minimum spread value is zero, the difference between the optimal minimum spread value and the delay spread for the LEQ-routing configuration does not exceed 100% of the latter.

While this invention has been described with reference to illustrative embodiments, this description is not intended to be construed in a limiting sense. For example, a network in which various embodiments of the invention can be practiced may contain routers capable of supporting wireline and/or wireless communication links. Methods of the invention can be appropriately modified to handle LEQ routing for multiple application servers. Various modifications of the described embodiments, as well as other embodiments of the invention, which are apparent to persons skilled in the art to which the invention pertains are deemed to lie within the principle and scope of the invention as expressed in the following claims.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a router or server, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A method of routing packets between a set of two or more client terminals and an application server, all connected to a network, the method comprising the steps of:
   selecting M hub nodes from a pool of candidate hub nodes, each candidate hub node being a router of said network, where M is a positive integer;
   for each client terminal in said set, assigning m of the M hub nodes for latency-equalization (LEQ) routing, where m is a positive integer and m≦M;
   instructing an edge router connected to a client terminal belonging to said set to direct packets designated for LEQ routing from the client terminal to the application server, through at least one of the m hub nodes assigned to the client terminal;
instructing an edge router connected to the application server to direct packets designated for LEQ routing from the application server to the client terminal, through at least one of the m hub nodes assigned to the client terminal;
for each client terminal in said set, compiling a delay table listing delays corresponding to network paths that connect the client terminal and the application server through the candidate hub nodes;
merging said delay tables to compile a delay inventory, wherein the step of selecting comprises selecting the M hub nodes based on the delay inventory;
removing, from the delay inventory, entries having delays greater than a specified threshold value to create a truncated inventory; and
for each entry of the truncated inventory, compiling, based on respective one or more constraints, a potential hub-node assignment list that provides at least m covers for each of the client terminals in said set.

2. The invention of claim 1, wherein at least one of the m hub nodes assigned to a first client terminal is different from any one of the m hub nodes assigned to a second client terminal.

3. The invention of claim 1, wherein m<M.

4. The invention of claim 1, wherein the step of compiling the potential hub-node assignment list comprises:
calculating delay differences between said entry of the truncated delay inventory and each of the other entries of the truncated delay inventory; and
sorting the calculated delay differences to determine a minimum delay difference, $\delta_{min}$,
wherein said minimum delay difference $\delta_{min}$ is used to establish said respective one or more constraints.

5. The invention of claim 1, further comprising the steps of:
for each potential hub-node assignment list, calculating a spread of delay values for the network paths corresponding to said list;
finding a minimum spread value among the calculated spreads of delay values; and
selecting the candidate hub nodes listed in the potential hub-node assignment list corresponding to said minimum spread value to be the M hub nodes.

6. The invention of claim 1, wherein the step of compiling the potential hub-node assignment list comprises compiling said list one entry at a time by:
identifying a candidate hub node that provides a maximum number of covers for the client terminals in said set;
removing from consideration said identified candidate hub node;
removing from consideration all client terminals having at least m covers; and
repeating the identifying and removing steps until each of the client terminals in said set has at least m covers.

7. The invention of claim 1, wherein LEQ-routing delay differences corresponding to the selected M hub nodes do not exceed a threshold spread value that at least approximates an optimal minimum spread value attainable for said network based on its topology, location of the candidate hub nodes, client terminals, and application server, and the values of m and M.

8. The invention of claim 7, wherein a difference between the threshold spread value and the optimal minimum spread value does not exceed about 100% of the threshold spread value.

9. The invention of claim 1, wherein a hub node is a programmable router of said network adapted to use a forwarding table corresponding to said assignments.

10. The invention of claim 9, wherein said programmable hub node is adapted to establish for LEQ routing at least one of (i) a transmission tunnel between itself and the edge router connected to the client terminal and (ii) a transmission tunnel between itself and the edge router connected to the application server.

11. The invention of claim 9, wherein said programmable hub node is adapted to support two or more applications, each employing a different respective LEQ-routing configuration.

12. The invention of claim 1, wherein the method is executed at a network-management server of said network.

13. A network-management server adapted to configure a network for routing packets between a set of two or more client terminals and an application server, all connected to the network, wherein the network-management server is adapted to:
select M hub nodes from a pool of candidate hub nodes, each candidate hub node being a router of said network, where M is a positive integer;
for each client terminal in said set, assign m of the M hub nodes for latency-equalization (LEQ) routing, where m is a positive integer and m≦M;
instruct an edge router connected to a client terminal belonging to said set to direct packets designated for LEQ routing from the client terminal to the application server, through at least one of the m hub nodes assigned to the client terminal;
instruct an edge router connected to the application server to direct packets designated for LEQ routing from the application server to the client terminal, through at least one of the m hub nodes assigned to the client terminal;
for each client terminal in said set, compile a delay table listing delays corresponding to network paths that connect the client terminal and the application server through the candidate hub nodes;
merge said delay tables to compile a delay inventory, wherein the step of selecting comprises selecting the M hub nodes based on the delay inventory;
remove, from the delay inventory, entries having delays greater than a specified threshold value to create a truncated inventory; and
for each entry of the truncated inventory, compile, based on respective one or more constraints, a potential hub-node assignment list that provides at least m covers for each of the client terminals in said set.

14. A network comprising:
a plurality of interconnected routers adapted to route packets between a set of two or more client terminals and an application server, all connected to the network; and
a network-management server adapted to:
select M hub nodes from a pool of candidate hub nodes, each candidate hub node being a router of said network, where M is a positive integer; and
for each client terminal in said set, assign m of the M hub nodes for latency-equalization (LEQ) routing, where m is a positive integer and m≦M;
instruct an edge router connected to a client terminal from said set to direct packets designated for LEQ routing from the client terminal to the application server, through at least one of the m hub nodes assigned to the client terminal;
instruct an edge router connected to the application server to direct packets designated for LEQ routing from the application server to the client terminal, through at least one of the m hub nodes assigned to the client terminal;

for each client terminal in said set, compile a delay table listing delays corresponding to network paths that connect the client terminal and the application server through the candidate hub nodes;

merge said delay tables to compile a delay inventory, wherein the step of selecting comprises selecting the M hub nodes based on the delay inventory;

remove, from the delay inventory, entries having delays greater than a specified threshold value to create a truncated inventory; and for each entry of the truncated inventory, compile, based on respective one or more constraints, a potential hub-node assignment list that provides at least m covers for each of the client terminals in said set.

15. A method of routing packets between a set of two or more client terminals and an application server, all connected to a network, the method comprising the steps of:

selecting M hub nodes from a pool of candidate hub nodes, each candidate hub node being a router of said network, where M is a positive integer;

for each client terminal in said set, assigning m of the M hub nodes for latency-equalization (LEQ) routing, where m is a positive integer and $m \leq M$;

instructing an edge router connected to a client terminal belonging to said set to direct packets designated for LEQ routing from the client terminal to the application server, through at least one of the m hub nodes assigned to the client terminal;

instructing an edge router connected to the application server to direct packets designated for LEQ routing from the application server to the client terminal, through at least one of the m hub nodes assigned to the client terminal;

compiling a catalog of minimum and maximum delays corresponding to network paths that connect said set and the application server through each of the candidate hub nodes;

sorting the catalog by the minimum delays to create a first sorted copy; and sorting the catalog by the maximum delays to create a second sorted copy, wherein the step of selecting comprises selecting the M hub nodes based on the first and second sorted copies.

16. The invention of claim 15, wherein m=M.

17. The invention of claim 15, wherein the step of selecting comprises, for each entry of the first sorted copy, identifying in the second sorted copy M candidate hub nodes characterized by shortest of the maximum delays and the minimum delays greater than the minimum delay of said entry of the first sorted copy.

18. The invention of claim 17, wherein the step of selecting further comprises:

for each entry of the first sorted copy, calculating a spread of delay values corresponding to the identified M candidate hub nodes;

finding a minimum spread value among the calculated spreads of delay values; and selecting the identified candidate hub nodes corresponding to said minimum spread value to be the M hub nodes.

* * * * *